(12) United States Patent
Saito et al.

(10) Patent No.: US 7,191,457 B2
(45) Date of Patent: Mar. 13, 2007

(54) OPTICAL DISK APPARATUS HAVING A STRUCTURE FOR VIBRATION ATTENUATION AND HEAT DISSIPATION

(75) Inventors: Hironori Saito, Hitachioota (JP); Ikuo Nishida, Ebina (JP); Yoichi Narui, Matsudo (JP); Kohei Takita, Mitaka (JP); Kenji Watabe, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 446 days.

(21) Appl. No.: 10/785,847

(22) Filed: Feb. 23, 2004

(65) Prior Publication Data

US 2004/0233828 A1 Nov. 25, 2004

(30) Foreign Application Priority Data

Feb. 28, 2003 (JP) .............................. 2003-053881

(51) Int. Cl.
*G11B 7/08* (2006.01)
*G11B 33/08* (2006.01)
*G11B 33/14* (2006.01)

(52) U.S. Cl. ...................................... 720/678; 720/679
(58) Field of Classification Search ................ 720/678, 720/688, 679, 676, 672, 658, 648, 650, 651, 720/649, 692

See application file for complete search history.

(56) References Cited

U.S. PATENT DOCUMENTS 5,063,548 A * 11/1991 Yamashita et al. ........ 369/44.14
5,278,820 A * 1/1994 Shtipelman ................. 720/666

FOREIGN PATENT DOCUMENTS

JP 2002-124075 4/2002
JP 2002-203330 7/2002

* cited by examiner

*Primary Examiner*—Julie Anne Watko
(74) *Attorney, Agent, or Firm*—Townsend & Townsend and Crew

(57) ABSTRACT

Guide members for guiding an optical pickup for movement in directions parallel to a diameter of an optical disk relative to the optical disk are formed of a metal, support members supporting the guide members on a chassis are formed of a resin, and heat transfer members formed of a metal are set in contact with the guide members and the chassis to achieve both the dissipation of heat generated by the optical pickup and the isolation of the optical pickup from vibrations. The guide support members attenuate vibrations propagating from the chassis toward the optical pickup, and heat generated by the optical pickup is dissipated through the heat transfer members into the chassis.

5 Claims, 3 Drawing Sheets

OPTICAL DISK APPARATUS HAVING A STRUCTURE FOR VIBRATION ATTENUATION AND HEAT DISSIPATION

BACKGROUND OF THE INVENTION

1. Technical Field of the Invention

The present invention relates to an optical disk drive and, more specifically, to techniques for dissipating heat from and isolating from the vibration an optical pickup included in an optical disk drive.

2. Description of the Related Art

A known technique for dissipating heat from an optical pickup included in an optical disk drive sets a guide member for guiding an optical pickup for movement in radial directions relative to a disk in direct contact with a chassis. A known technique for isolating an optical pickup from vibrations forms a guide member for guiding the optical pickup of a resin or forms support members supporting the guide member of a resin.

A prior art technique relating to the present invention is disclosed in JP-A 2002-203330 (Patent document 1). Patent document 1 mentions a structure in which a slide shaft (guide member) or a bearing in sliding contact with the slide shaft is formed of a resin to insulate the slide shaft from a base such that short circuit between a metallic heat radiator incorporated into a photoelectric device included in an optical pickup and a chassis is avoided, and the heat radiator is connected by a heat transfer member to the base to transfer heat efficiently from the metallic heat radiator to the base.

When the guide member is held directly on the chassis, vibrations generated by the chassis are easily transmitted from the chassis to the optical pickup and the optical pickup cannot be isolated from vibrations. Although the optical pickup can be isolated from vibrations when the guide member or a support member supporting the guide member is formed of a resin, a heat transfer passage cannot be formed between the optical pickup and the chassis and hence there is a difficulty in transferring heat from the optical pickup to the chassis.

Although the technique mentioned in Patent document 1 transfers heat from the metallic heat radiator of the photoelectric device to the base through the heat-transfer member, any heat transfer path is not formed from the base through the slide shaft (guide member) to the chassis. Consequently, heat generated in the optical pickup cannot be satisfactorily dissipated toward the chassis.

The present invention has been made in view of those problems in the prior art and it is therefore an object of the present invention to provide an optical disk drive capable of achieving both heat dissipation from an optical pickup and isolation of the optical pickup from vibrations.

SUMMARY OF THE INVENTION

Basically, in an optical disk drive according to the present invention, guide members for guiding an optical pickup for movement in directions parallel to a diameter of an optical disk relative to the optical disk are formed of a metal, support members supporting the guide members on a chassis are formed of a resin, and heat transfer member formed of a metal are set in contact with the guide members and the chassis. The guide support members attenuate vibrations propagating from the chassis toward the optical pickup, and heat generated by the optical pickup is dissipated through the heat transfer members into the chassis.

According to a first aspect of the present invention, an optical disk drive includes: guide members formed of a metal, and engaged with an optical pickup or a support member supporting the optical pickup to guide the optical pickup for movement; a chassis formed of a metal, and serving as a base for supporting at least the guide members thereon; guide support members formed of a resin, interposed between the guide members and the chassis, and supporting the guide members on the chassis; and heat transfer members formed of a metal and set in contact with the guide members and the chassis to transfer heat from the guide members to the chassis.

According to a second aspect of the present invention, an optical disk drive includes: a main guide member formed of a metal, and engaged with a first part, on the side of a drive mechanism for moving a movable unit including an optical pickup, of the movable unit to guide the optical pickup for movement; an auxiliary guide member formed of a metal, extended substantially parallel to the main guide member, and engaged with a second part, on a side opposite the drive mechanism, of the movable unit to guide the optical pickup for movement; a chassis formed of a metal, and supporting at least the main and the auxiliary guide member thereon; guide support members formed of a resin, interposed between the main guide member and the chassis and between the auxiliary guide member and the chassis to support the main and the auxiliary guide member on the chassis; and a heat transfer means including either or both of a first heat transfer member formed of a metal, set in contact with the main guide member to transfer heat from the main guide member to the chassis, and a second heat transfer member formed of a metal, set in contact with the auxiliary guide member to transfer heat from the auxiliary guide member to the chassis.

The optical disk drive according to the present invention is capable of simultaneously achieving both the dissipation of heat generated in the optical pickup and the isolation of the optical pickup from vibrations.

DESCRIPTION OF THE PREFERRED EMBODIMENTS

Preferred embodiments of the present invention will be described with reference to the accompanying drawings.

Figure 1:
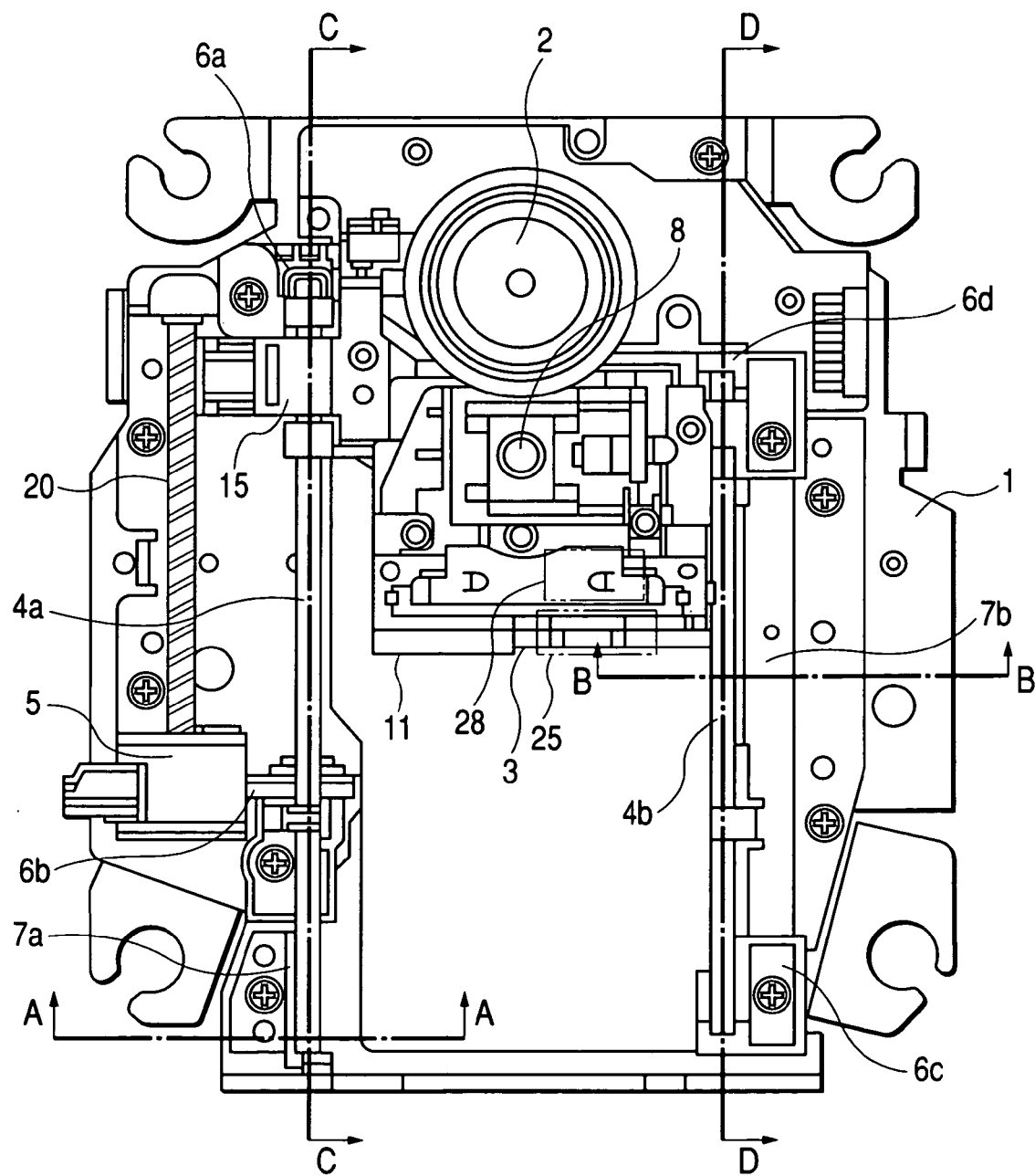
FIG. 1 is a plane view of an optical disk drive in a preferred embodiment according to the present invention.
Figure 2:
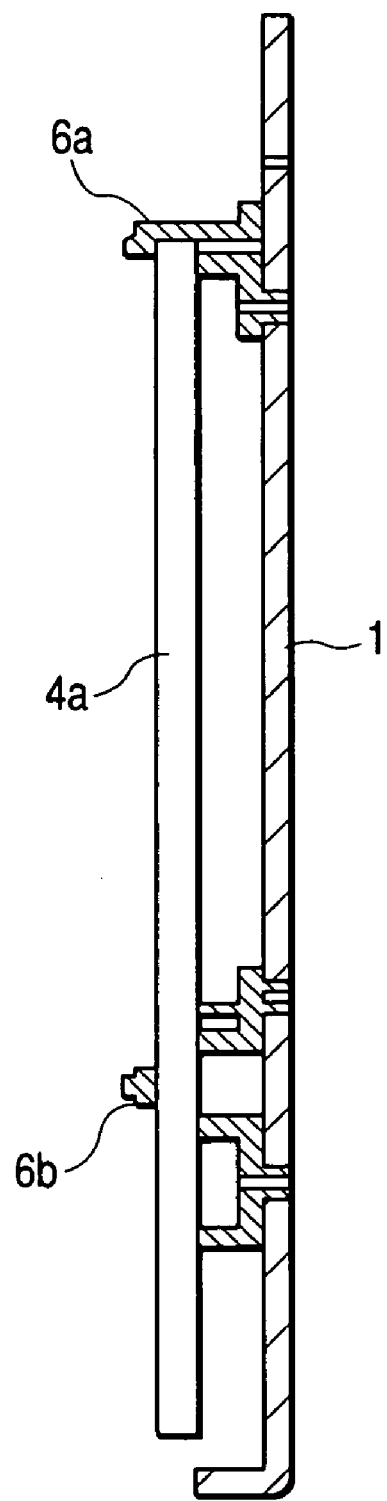
FIG. 2 is a sectional view of assistance in explaining a supporting arrangement for supporting a main guide member included in the optical disk drive shown in FIG. 1.
Figure 3:
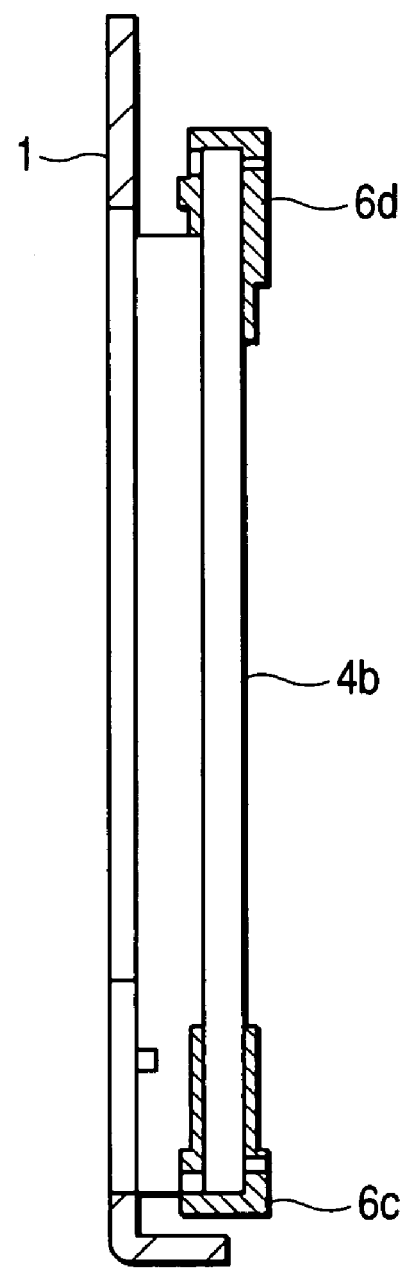
FIG. 3 is a sectional view of assistance in explaining a supporting arrangement for supporting an auxiliary guide member included in the optical disk drive shown in FIG. 1.
Figure 4:
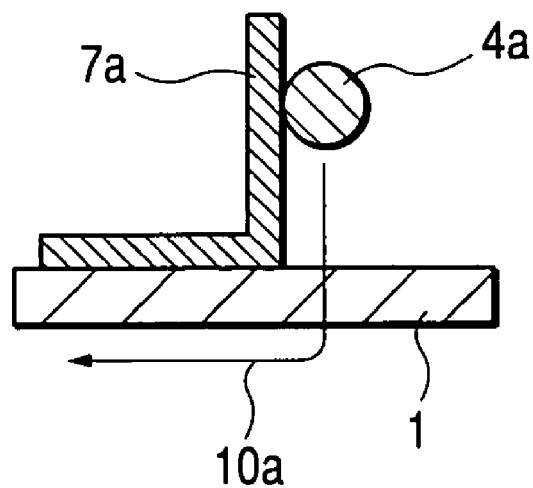
FIG. 4 is a sectional view of assistance in explaining a heat transfer passage for the main guide member included in the optical disk drive shown in FIG. 1.
Figure 5:
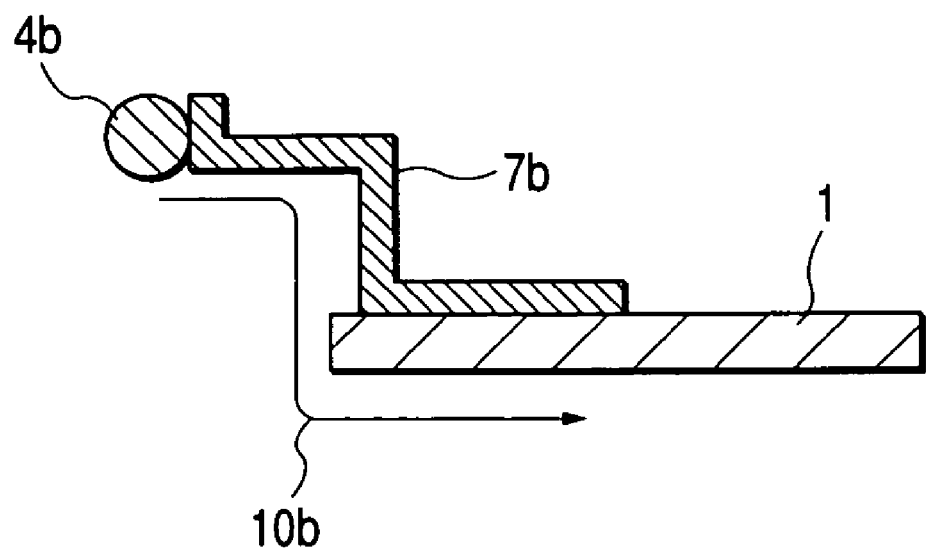
FIG. 5 is a sectional view of assistance in explaining a heat transfer passage for the auxiliary guide member included in the optical disk drive shown in FIG. 1.

FIGS. 1 to 5 illustrate an optical disk drive according to an embodiment of the present invention. FIG. 1 is a plane view of the optical disk drive, FIG. 2 is a sectional view of assistance in explaining a supporting arrangement for supporting a main guide member included in the optical disk drive shown in FIG. 1, FIG. 3 is a sectional view of assistance in explaining a supporting arrangement for supporting an auxiliary guide member included in the optical disk drive shown in FIG. 1, FIG. 4 is a sectional view of assistance in explaining a heat transfer passage for the main guide member included in the optical disk drive shown in FIG. 1, and FIG. 5 is a sectional view of assistance in explaining a heat transfer passage for the auxiliary guide member included in the optical disk drive shown in FIG. 1.

Referring to FIG. 1, there are shown a chassis 1 formed of a metal, a spindle motor 2 for rotating an optical disk, not shown, an optical pickup 3 including an optical head 8, a movable unit 11 including the optical pickup 3, a bar-shaped main guide member 4a formed of a metal, and engaged with a first part, on the side of a drive mechanism, of the movable unit 11, a drive mechanism 15 including the drive mechanism for moving the movable unit 11, a bar-shaped auxiliary guide member 4b formed of a metal, and engaged with a second part, on a side opposite the drive mechanism, of the movable unit 11 to guide the optical pickup 3 in cooperation with the main guide member 4a for movement in radial directions relative to the optical disk, a feed motor 5 that produces drive force for moving the movable unit 11, first guide support members 6a and 6b formed of a resin and supporting the main guide member 4a at a predetermined position in a predetermined posture, second guide support members 6c and 6d formed of a resin and supporting the auxiliary guide member 4b at a predetermined position in a predetermined posture, a first heat transfer member 7a formed of a metal set in contact with the main guide member 4a and the chassis 1 to transfer heat from the main guide member 4a to the chassis 1, a second heat transfer member 7b formed of a metal and set in contact with the auxiliary guide member 4b and the chassis 1 to transfer heat from the auxiliary guide member 4b to the chassis 1, a feed screw 20 driven for rotation by the feed motor 5 to transmit the drive force of the feed motor 5 to the drive mechanism 15, a part 25, in which a laser diode, not shown, as a light source, and a hologram, not shown, are placed, of the optical pickup 3, and a part 28 in which a laser-driving IC, not shown, for driving the laser diode and the hologram is placed.

The main guide member 4a and the auxiliary guide member 4b are disposed with their axes extended parallel to a diameter of the optical disk substantially parallel to each other. Both the main guide member 4a and the auxiliary guide member 4b are coated with grease or a heat-conductive material. A gap between the main guide member 4a and the first heat transfer member 7a, and a gap between the auxiliary guide member 4b and the second heat transfer member 7b are filled up with the grease or the heat-conductive material. When the grease or the heat-conductive material has lubricity, the grease or the heat-conductive material can be used as a lubricating means for lubricating the sliding surfaces of the main guide member 4a, the auxiliary guide member 4b and the movable unit 11. The first heat transfer member 7a is in contact with the surface of one end part of the main guide member 4a. The second heat transfer member 7b is in contact with the surface of the entire length of the auxiliary guide member 4b.

With this configuration, when the optical disk drive operates for, for example, a recording operation, the spindle motor 2 rotates the optical disk at a predetermined rotating speed, the main guide member 4a and the auxiliary guide member 4b guide the movable unit 11 for movement relative to the optical disk. The feed motor 5 moves the movable unit 11 from a radially inner position toward a radially outer position with respect to the optical disk. While the movable unit 11 is thus moved radially, the laser-driving IC drives the laser diode and the hologram included in the optical pickup 3, and the laser diode emits a laser beam. The laser beam travels through an optical system included in the optical pickup 3 and is focused on the recording surface of the optical disk by an objective not shown included in the optical head 8. The laser diode, the hologram and the laser-driving IC generate heat and temperatures of the laser diode, the hologram, the laser-driving IC and the associated parts increase.

The generated heat is conducted from the movable unit 11 to the main guide member 4a through the drive mechanism 15, and to the auxiliary guide member 4b through the part, in engagement with the auxiliary guide member 4b, of the movable unit 11. In the optical disk drive shown in FIG. 1, the auxiliary guide member 4b is closer to the laser diode, the hologram and the laser-driving IC than the main guide member 4a. Consequently, the amount of heat transferred to the auxiliary guide member 4b is greater than that of heat transferred to the main guide member 4a. Heat transferred to the main guide member 4a is dissipated through the first heat transfer member 7a into the chassis 1. Heat transferred to the auxiliary guide member 4b is dissipated through the second heat-transfer member 7b to the chassis 1. When gaps are formed between the main guide member 4a and the first heat transfer member 7a and between the auxiliary guide member 4b and the second heat transfer member 7b, the gaps are filled up with the grease or the heat-conductive material, and heat is conducted through the grease or the heat-conductive material from the main guide member 4a to the first heat transfer member 7a, and from the auxiliary guide member 4b to the second heat transfer member 7b. The generated heat is thus dissipated to suppress the rise of the temperature of the optical pickup 3 during the recording operation.

External vibrations or vibrations generated by the chassis 1 are transmitted to the optical head 8 of the optical pickup 3 through two vibration transmission paths, namely, a first vibration transmission path including the chassis 1, the first guide support members 6a and 6b, the main guide member 4a, the movable unit 11 and the optical pickup 3, and a second vibration transmission path including the chassis 1, the second guide support members 6c and 6d, the auxiliary guide member 4b, the movable unit 11 and the optical pickup 3. In the optical disk drive shown in FIG. 1, the first guide support members 6a and 6b formed of a resin, and the second guide support members 6c and 6d formed of a resin absorb and attenuate vibrations. Consequently, attenuated vibrations are transmitted through the main guide member 4a and the auxiliary guide member 4b to the optical pickup 3. Thus, the vibration of the optical head 8 can be suppressed and the disturbance of focusing control operation and tracking control operation can be prevented.

Referring to FIG. 2 showing a support structure supporting the main guide member 4a in a sectional view taken on line C—C in FIG. 1, the bar-shaped main guide member 4a formed of a metal is supported by the first guide support members 6a and 6b formed of a resin. The first guide support members 6a and 6b are fastened to the chassis 1. The first guide support members 6a and 6b absorb and attenuate vibrations generated by the chassis 1, and attenuated vibrations are transmitted to the main guide member 4a.

Referring to FIG. 3 showing a support structure supporting the auxiliary guide member 4b in a sectional view taken on line D—D in FIG. 1, the bar-shaped auxiliary guide member 4a formed of a metal is supported by the second guide support members 6c and 6d formed of a resin. The second guide support members 6c and 6d are fastened to the chassis 1. The second guide support members 6c and 6d absorb and attenuate vibrations generated by the chassis 1, and attenuated vibrations are transmitted to the auxiliary guide member 4b.

Referring to FIG. 4 showing a heat dissipating path on the side of the main guide member 4a in a sectional view taken on line A—A in FIG. 1, the first heat transfer member 7a is set in contact with the chassis 1 and the surface of part of the main guide member 4a, i.e., part of the main guide member 4a below the first guide support member 6b at a position near one end of the main guide member 4a, as viewed in FIGS. 1 and 2, such that the first heat transfer member 7a does not obstruct the movement of the drive mechanism 15 for moving the movable unit 11. When a gap is formed between the main guide member 4a and the first heat transfer member 7a, and the gap is filled up with the grease or the heat-conductive material, heat is conducted by the grease or the heat-conductive material from the main guide member 4a to the first heat transfer member 7a to compensate for the reduction of heat transfer due to the gap. In FIG. 4, indicated at 10a is a heat transmission path extending from the main guide member 4a through the first heat transfer member 7a to the chassis 1. Since the auxiliary guide member 4b is closer to the laser diode, the hologram and the laser driving IC of the optical disk drive shown in FIG. 1 than the main guide member 4a, the amount of heat transferred to the main guide member 4a is smaller than that of heat transferred to the auxiliary guide member 4b. Therefore, heat can be satisfactorily dissipated through the main guide member 4a even though the length of the part of the main guide member 4a in contact with the first heat transfer member 7a is comparatively short.

Referring to FIG. 5 showing a heat dissipating path on the side of the auxiliary guide member 4b in a sectional view taken on line B—B in FIG. 1, the second heat transfer member 7b is set in contact with the chassis 1 and the surface of the substantially entire length of the auxiliary guide member 4b. When a gap is formed between the auxiliary guide member 4b and the second heat transfer member 7b, and the gap is filled up with the grease or the heat-conductive material, heat is conducted by the grease or the heat-conductive material from the auxiliary guide member 4b to the second heat transfer member 7b to compensate for the reduction of heat transfer due to the gap. In FIG. 5, indicated at 10b is a heat transmission path extending from the auxiliary guide member 4b through the second heat transfer member 7b to the chassis 1. Since auxiliary guide member 4b is closer to the laser diode, the hologram and the laser driving IC of the optical disk drive shown in FIG. 1 than the main guide member 4a, the amount of heat transferred to the auxiliary guide member 4b is greater than that of heat transferred to the main guide member 4a. Therefore, the second heat transfer member 7b is in contact with the long part of the auxiliary guide member 4b to ensure that heat can be satisfactorily dissipated.

The optical disk drive according to the present invention is capable of simultaneously achieving both the dissipation of heat from the optical pickup and the isolation of the optical pickup from vibrations. Consequently, the breakage of electronic circuits included in the optical pickup can be prevented, and accurate focus control operation and accurate tracking control operation can be achieved.

Although the auxiliary guide member is closer to the laser diode, the hologram and the laser driving IC that generate heat than the main guide member in this optical disk drive in the preferred embodiment, some or all of those components may be disposed near the main guide member and far from the auxiliary guide member. When those components are disposed so, the first heat transfer member 7a combined with the main guide member 4a, and the second heat transfer member 7b combined with the auxiliary guide member 4b are formed so as to form heat transfer paths meeting the arrangement of the components. Similar heat transfer paths are formed when members that generate heat other than the laser diode, the hologram and the laser driving IC are mounted on the optical pickup. A single heat transfer member may be combined only with either the main guide member 4a or the auxiliary guide member 4b instead of combining the heat transfer members 7a and 7b with the main guide member 4a and the auxiliary guide member 4b, respectively.

As the present invention may be embodied in various embodiments other than the foregoing embodiment without departing from the scope and spirit of essential characteristics thereof, the embodiment specifically described herein is therefore illustrative and not restrictive in all respects. The scope of the present invention is set forth in the accompanying claims. It is to be understood that changes and variations meeting the accompanying claims are included in the present invention.

What is claimed is:

1. An optical disk drive provided with an optical pickup that is moved in directions parallel to a diameter of an optical disk relative to the optical disk to write and read information to and from the optical disk, said optical disk drive comprising:
  guide members formed of a metal, and engaged with the optical pickup or a support member supporting the optical pickup to guide the optical pickup for movement;
  a chassis formed of a metal, and service as a base for supporting at least the guide members thereon;
  guide support members formed of a resin, to attenuate vibration caused by the movement of the optical pickup, interposed between the guide members and the chassis, and supporting the guide members on the chassis; and
  heat transfer members formed of a metal and directly set in contact with the guide members and the chassis to transfer heat from the guide members to the chassis.

2. An optical disk drive provided with an optical pickup that is moved in directions parallel to a diameter of an optical disk relative to the optical disk to write and read information to and from the optical disk, said optical disk drive comprising:
  a main guide member formed of a metal, and engaged with a first part, on the side of a drive mechanism for moving a movable unit including the optical pickup, to guide the optical pickup for movement;
  an auxiliary guide member formed of a metal, extended substantially parallel to the main guide member, and engaged with a second part, on a side opposite the drive mechanism, of the movable unit to guide the optical pickup for movement;
  a chassis formed of a metal, and supporting at least the main and the auxiliary guide member thereon;
  guide support members formed of a resin to attenuate vibration caused by the movement of the optical pickup, interposed between the main guide member and the chassis and between the auxiliary guide member and the chassis to support the main and the auxiliary guide member on the chassis; and a heat transfer means including either or both of a first heat transfer member formed of a metal, set in contact with the main guide member to transfer heat from the main guide member to the chassis, and a second heat transfer member formed of a metal, directly set in contact with the auxiliary guide member to transfer heat from the auxiliary guide member to the chassis.

3. The optical disk drive according to claim 2, wherein a length of a part, in contact with the auxiliary guide member, of the second heat transfer member is longer than that of a part, in contact with the main guide member, of the first heat transfer member when the auxiliary guide member is closer to a laser diode, a hologram or a laser driving IC included in the movable unit than the main guide member, and a length of a part, in contact with the main guide member, of the first heat transfer member is longer than that of a part, in contact with the auxiliary guide member, of the second heat transfer member when the main guide member is closer to a laser diode, a hologram or a laser driving IC included in the movable unit than the auxiliary guide member.

4. The optical disk drive according to claim 2, wherein gaps between the first heat transfer member and the main guide member and between the second heat transfer member and the auxiliary guide member, or a gap between the first heat transfer member and the main guide member or between the second heat transfer member and the auxiliary guide member is filled up with grease or a heat-conductive material.

5. The optical disk drive according to claim 2, wherein the second part, engaged with the auxiliary guide member, of the movable unit is closer to the laser diode, the hologram or the laser driving IC than the first part, engaged with the main guide member, of the movable unit.

* * * * *